United States Patent
Lucovsky

(10) Patent No.: US 6,868,450 B1
(45) Date of Patent: Mar. 15, 2005

(54) SYSTEM AND METHOD FOR A PROCESS ATTRIBUTE BASED COMPUTER NETWORK FILTER

(75) Inventor: Jeffrey A. Lucovsky, Cary, NC (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/572,803

(22) Filed: May 17, 2000

(51) Int. Cl.$^7$ ............................................. G06F 15/16
(52) U.S. Cl. ...................... 709/229; 709/225; 709/321; 710/36; 711/118; 711/133; 711/154; 713/154; 713/201
(58) Field of Search ............................... 709/229, 321; 713/201

(56) References Cited

U.S. PATENT DOCUMENTS

| | | | |
|---|---|---|---|
| 5,721,818 A | * | 2/1998 | Hanif et al. ................. 709/228 |
| 5,987,611 A | * | 11/1999 | Freund |
| 6,076,168 A | * | 6/2000 | Fiveash et al. |
| 6,173,364 B1 | * | 1/2001 | Zenchelsky et al. |
| 6,205,492 B1 | * | 3/2001 | Shaw et al. |
| 6,408,336 B1 | * | 6/2002 | Schneider et al. |

FOREIGN PATENT DOCUMENTS

| | | | | |
|---|---|---|---|---|
| EP | 0913967 | 5/1999 | ............ | H04L/12/24 |
| WO | WO 99/40502 | 8/1999 | ............. | G06F/1/00 |

* cited by examiner

Primary Examiner—Hosain Alam
Assistant Examiner—Michael Y Won

(57) ABSTRACT

A system and method for a process attribute based computer network filter assigns a process attribute to a process executing on a computing device and assigns a network attribute to a network interface card (NIC) associated with the computing device. When the process desires to send a communication packet to another process on a different computing device over a network to which the NIC is connected, the process sends an application program interface (API) system call to the NIC. The API call is intercepted by a system call trap handler, which, in cooperation with a session filter driver and a network filter driver, determines the process attribute associated with the process and the network attribute associated with the NIC. If the session filter driver and the network filter driver, in cooperation with the system call trap handler, determine that the process attribute and the network attribute correspond, then the communication packet is allowed to pass to the network. Similarly, a packet received over the network is processed by the session filter driver and the network filter driver to determine whether the packet can pass to the process to which the received packet is destined.

19 Claims, 10 Drawing Sheets

SYSTEM AND METHOD FOR A PROCESS ATTRIBUTE BASED COMPUTER NETWORK FILTER

TECHNICAL FIELD

The present invention relates generally to computer systems, and, more particularly, to a system and method for implementing a process attribute based computer network filter.

BACKGROUND OF THE INVENTION

Modern computer systems perform a variety of processing and communication tasks. For example, computers execute application programs such as word processing programs, scheduling programs, design programs, etc. Computers are also used to connect to other computers in order to exchange information. For example, a computer may execute a program that enables the computer to access information stored on other computers. For example, in order to access the Internet, a computer may execute what is referred to as a "web browser" program. The web browser is an application program, similar to that described above, that enables the computer to navigate through the Internet.

When a computer starts an application program, the computer creates what is referred to as a "process" corresponding to the program. The process contains an instance of the application program and a number of attributes that associate the process to the computer user and to other elements associated with the process. For each instance of the program, another process is invoked. Multiple programs having corresponding processes may operate on a computer simultaneously. Furthermore, one application program may have multiple processes running at the same time.

Some processes, such as, for example but not limited to, a word processing program, may interact with files that are stored on the computer that is executing the process, and also may interact with other computers over a network. The network may be a local area network (LAN) or a wide area network (WAN). Such networks allow multiple computers to communicate with each other.

Typically, each process and each file includes a set of attributes, which may determine, for example, access control. For example, a process executing on a computer has a set of attributes assigned, which may determine whether it may access a particular file, which also includes a (generally) different set of attributes. Some of the attributes assigned to the file define the required set of attributes that a process must have in order to access the file. For example in the UNIX operating system, each file includes permission attributes, which specify the owner, group and world (everyone) access to the file. If the file attributes specify that a particular group has "read" and "write" access, but not "execute" access, a process possessing that group in its attribute set will only be able to read and write to the file, but not execute it.

When a process that is executing on a computer wishes to communicate with another computer over a network, the process typically sends and receives messages through a network interface card (NIC) associated with the computer. The NIC connects the computer to a network, to which the other computer is also attached through its own associated NIC.

In current computer systems, a process executing on a computer has access to and can use all the NICs on the computer. Unfortunately, there is no way to restrict access of a process executing on a computer to one or a set of NICs (and therefore the network to which the NIC is connected) and associated computers.

Therefore there is a need in the industry for a mechanism to assign certain attributes to a NIC and to processes executing on a computer, and a filter mechanism that can determine whether a process having a certain attribute may access a NIC in order to gain access to the network to which the computer and the NIC are connected.

SUMMARY OF THE INVENTION

The invention provides a system and method for a process attribute based computer network filter. The invention may be conceptualized as a process attribute based computer network filter system, comprising a software process operating on a computer, the software process including a process attribute, an application program interface (API) in communication with the software process and configured to communicate packets through a network transport control protocol/Internet protocol (TCP/IP) driver to a network interface card, the network interface card including a network attribute, and an operating system kernel in communication with the software process. The system also includes a system call trap handler associated with the operating system kernel, the system call trap handler configured to learn the process attribute and the network attribute, a session filter driver in communication with the system call trap handler, and a network filter driver associated with the system call trap handler. The system also includes a database associated with the session filter driver and the network filter driver, wherein the system call trap handler compares the process attribute with the network attribute to determine whether the software process can access the network interface card.

The invention may also be conceptualized as a method for a process attribute based computer network filter, the method comprising the steps of operating a software process on a computer, the software process including a program attribute, communicating packets through a network (TCP/IP) driver to a network interface card, the network interface card including a network attribute, and establishing a communication link between the process attribute and the network attribute. The method also includes the steps of placing the process attribute and the network attribute in a database, comparing the process attribute with the network attribute, and determining whether the software process can access the network interface card.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

DETAILED DESCRIPTION OF THE PREFERRED EMBODIMENT

Figure 1:
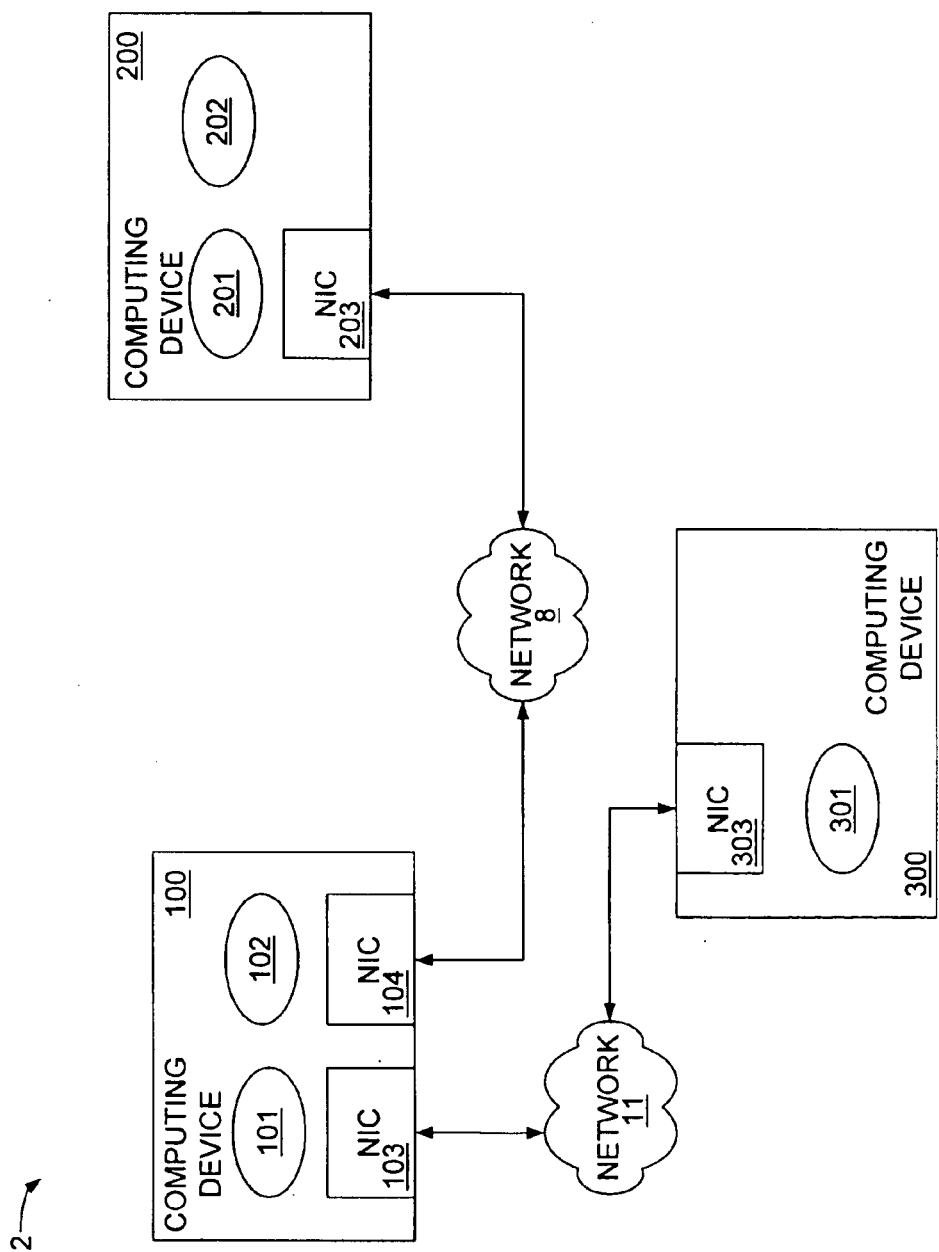
FIG. 1 is a block diagram illustrating the environment in which a computing device including the invention resides.

The invention to be described hereafter is applicable to all computer programs that execute within a discrete, protected domain of execution on a computing device and that have access control, and other attributes. Furthermore, while described below with respect to a single computer, the system and method for a process attribute based computer network filter is typically implemented in a networked computing arrangement in which a number of computing devices communicate over a local area network (LAN), over a wide area network (WAN), or over a combination of both LAN and WAN.

The system and method for a process attribute based computer network filter can be implemented in hardware, software, firmware, or a combination thereof. In the preferred embodiment(s), the invention is implemented in software or firmware that is stored in a memory and that is executed by a suitable instruction execution system. If implemented in hardware, as in an alternative embodiment, the invention can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The process attribute based computer network filter program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Turning now to the drawings, FIG. 1 is a block diagram illustrating a network environment 2 in which a computing device including the invention resides. Network environment 2 includes a plurality of interconnected computing devices connected by a plurality of networks. As shown in FIG. 1, computing device 100 and computing device 200 are interconnected via network 8. Network 8 may be any communication network, such as a local area network (LAN) or a wide area network (WAN). Computing device 100 and computing device 300 are interconnected via network 11, which may also be either a LAN or a WAN. Each computing device can be directly connected to at least one network. The computing device 100 uses a network interface card (NIC) 103 to connect to network 11 and a NIC 104 to connect to network 8. Similarly, the computing device 200 is connected to network 8 using a network interface card NIC 203 and the computing device 300 is connected to network 11 via a NIC 303.

A process 101 associated with an application program (not shown) and executing on computing device 100 can communicate (send and receive data) with a process 301 associated with an application program (not shown) and executing on computing device 300 using NIC103.

The process 301 uses the network interface card NIC 303 to send and receive packets from process 101. Typically, the computers communicate using TCP/IP to send and receive packets over the network to which they are connected. Thus, process 101 communicates with process 301 by exchanging TCP/IP packets via network 11, by using NIC 101. Similarly, the process 301 sends and receives TCP/IP packets over network 11, using NIC 301 to communicate with process 101.

In accordance with an aspect of the invention, there may be instances in which it may be necessary, or desirable, to restrict one or more processes executing on a computing device from accessing (making use of) one or more networks. For example, it may be necessary, or desirable, to restrict process 101 from communicating with any peer processes on network 8, but to allow process 101 to communicate with any (all) processes on network 11. This is an example only and is not dependent on the network connectivity shown in FIG. 1. In accordance with an aspect of the invention, and to be described below, the logic of the invention allows each computing device to control which application program executing on the device has access to which of its directly connected networks.

Figure 2:
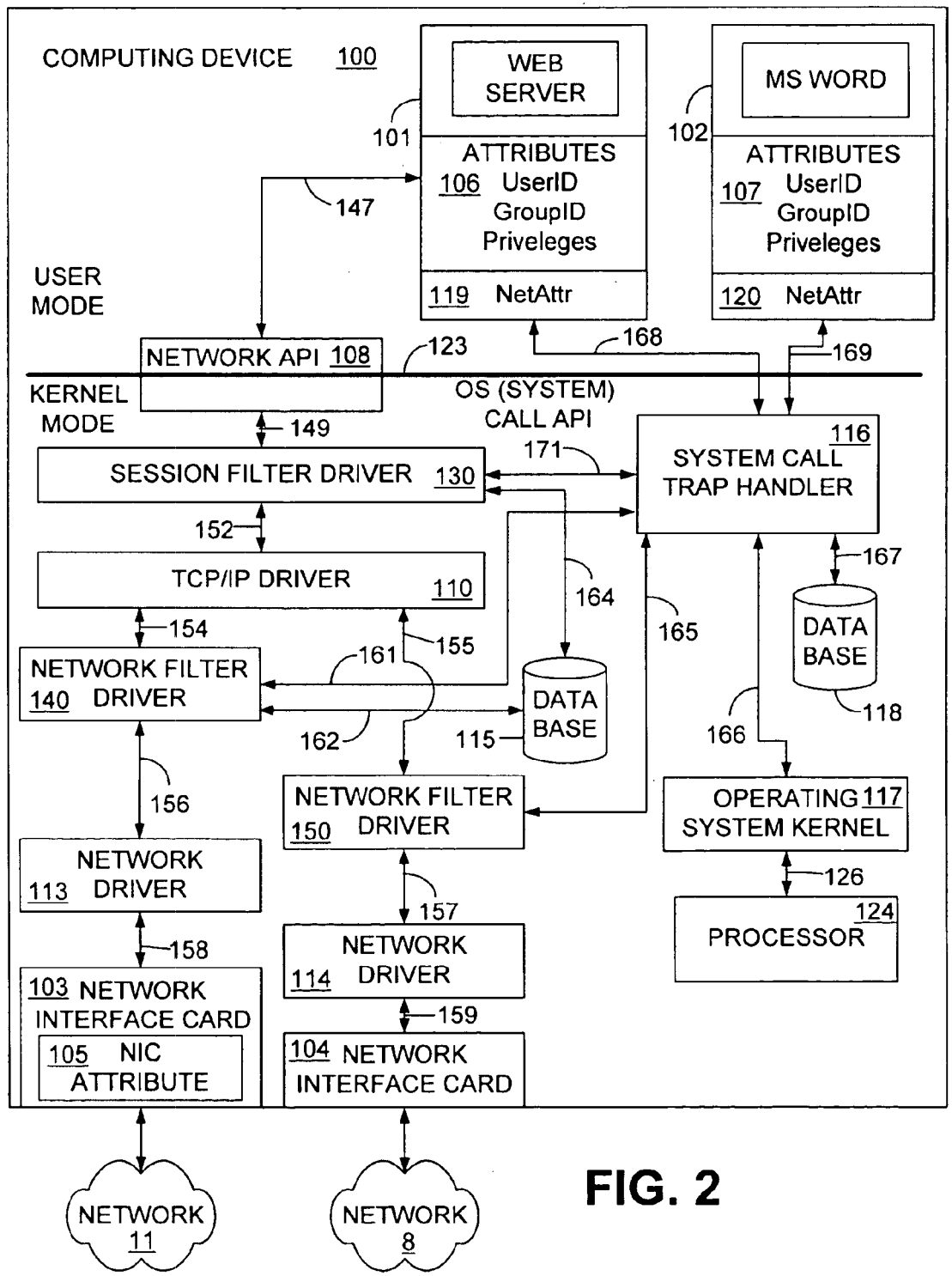
FIG. 2 is a schematic view illustrating a computer system constructed in accordance with an aspect of the invention.

FIG. 2 is a schematic view illustrating the network filtering system in accordance with an aspect of the invention. When a program is executed, the operating system kernel 117 creates a process. For example, process 101 could be a process of a "web server" application program and process 102 could be a process of a "document editing" application program, such as a word processing program. The process 101 has a set of attributes 106 associated with it, some of which are derived from the user invoking the program and others derived from the program itself. A few examples of attributes are user ID, group IDs, and privileges. Although illustrated within the process 101 (and logically connected to the process itself), these attributes 106 are created and maintained by the operating system kernel 117.

During the course of its execution, the process 101 makes use of many of the kernel services (e.g. open a file) available from operating system kernel 117, which communicates with processor 124 via connection 126. Computing device 100 also includes system call application program interface (API) 123, which exports the kernel services that are used by process 101. A subset of the system call API is referred to as the network API 108. The network API 108 executes system calls relating to the communication of messages over a network to which the computing device 100 is connected and is shown as a separate element for clarity. Furthermore, the processes 101 and 102 operate in what is referred to as the "user mode" and the balance of the elements shown in FIG. 2 operate in what is referred to as the "kernel mode."

All NICs on the computing devices are assigned (one or more) unique IP addresses with respect to the network to which the NIC's are connected. IP addresses can be public or private. Private IP addresses are commonly shared in that multiple instances of the same IP address may exist so long as they are on different networks. Processes, such as process 101 and process 102, on the computing device associate themselves with one (or more) available port numbers. These port numbers are unique (on the computing device) at a point in time, but may be reassigned to other processes when the original process chooses to disassociate itself from the port number. The three values (type of service=TCP/user datagram protocol (UDP), IP Address, Port Number) uniquely identify the process that is running on a computing device with a NIC having the IP Address, and which is associated with the type of service and port number. Note that a process can be addressed by multiple sets of these three values.

The set of {protocol, port number, IP address} will hereafter be referred to as an "endpoint" address. Endpoint address information is managed by the TCP/IP driver 110 in what will be referred to as a network object (for example in a socket structure as known by those skilled in the art). This network object may encapsulate other information as well. A process uses a handle to refer to the particular network object.

When a process (e.g., process 101) wishes to make use of one or more networks to initiate a connection with other remote processes (e.g., process 201 via network 8 or process 301 via network 11 of FIG. 1), the process 101 creates a particular type of network object using a network API system call 108. During creation of the endpoint, or before it can be used for communicating with the remote process, the process 101 chooses an endpoint (address) to be associated with the network object. The process 101 also specifies the endpoint (address) of the remote process. These operations are carried out by making use of the network API system calls 108, which are serviced by the TCP/IP driver 110. Although omitted from FIG. 2 for clarity, the TCP/IP driver 110 maintains the network object, which includes the type of service, the local endpoint port and IP address and the remote endpoint port and address. The process 101 then uses the handle to send and receive data to and from the remote process (which in turn has its own handle to its own network object).

A process (e.g. process 101) may also choose to wait for connections from other processes. In such a case, the process 101 creates a particular type of network object (UDP, TCP) using a network API system call (108). During creation of the network object, or sometime before it can be used to receive packets, the process 101 associates this network object with an endpoint address. This endpoint address can be used by remote processes to send packets to this process 101.

It should be noted that there may be multiple combinations of connections being initiated, and waiting for incoming connections simultaneously being performed by a process, but each of these requires a different network object.

The operation of the TCP/IP driver 110 may be summarized as follows: A process (e.g. process 101) initiating a connection requests a particular type of network object from the TCP/IP driver 110. The TCP/IP driver 110 returns a handle to a newly created network object. The type of the object is set to what is specified by the process 101. The process 101 associates an endpoint address (port number, IP address) with the network object using the handle returned by the TCP/IP driver 110. The TCP/IP driver 110 updates the network object with the local endpoint address information.

The process 101 then associates the endpoint address (protocol, port number, IP address) of the remote process, using the handle to the network object. The TCP/IP driver 110 updates the network object with the remote endpoint address information. The process 101 then sends data to and receives data from the remote process using the handle to the network object.

With respect to sending messages, the TCP/IP driver 110 frames the data and the information in the network object into packets and then determines the NIC on which the packet is to be routed. The TCP/IP driver 110 then sends the packet to the network interface card driver 113 (hereinafter "network driver 113"). The packet contains information on the remote endpoint address (destination) and the local endpoint address (source). The network driver 113 forwards the packet to a NIC (such as NIC 103), which sends the packet over the network 11. The remote process retrieves the message from the network 11.

With respect to receiving messages, the network driver 113 receives messages from the NIC 103 and forwards them to the TCP/IP driver 110. The TCP/IP driver 110 analyzes the remote endpoint address and the local endpoint (destination) information in the packet, and determines the proper network object to which the packet should be passed. Once the TCP/IP driver 110 determines the proper network object, it attaches the data in the packet to the network object. When the receiving process performs a receive network system call, and passes the handle to the network object, the receiving process can receive the data. When the receiving process has completed its communication, it closes the handle.

The operation of the attribute based computer network filter will now be described beginning with the description of the system call trap handler 116. The system call trap handler 116 is a software element that is layered into the operating system between the system call API 123 and the operating system kernel 117 to trap all system calls. The system call trap handler 116 inspects all system calls made by processes (101 and 102) and passes the calls to the operating system kernel 117 for further processing. The system call trap handler 116 communicates with process 101 via connection 168 and communicates with process 102 via connection 169. The system call trap handler 116 uses what is referred to as a "process creation" system call to add a new attribute to each process. For example, a process attribute 119 is added to process 101 and a process attribute 120 is added to process 102. The network attributes 119 and 120 may be abbreviated as "NetAttr." Although illustrated within each process (and logically connected to the process itself), the process attributes are created and maintained by the system call trap handler 116 in its associated database 118. The database 118 may be located internal to system call trap handler 116, but is illustrated as a separate database in FIG. 2 for clarity. The process attributes 119 and 120 may be created by using the user information, the program information or any combination of the two. The system call trap handler 116 also uses what is referred to as a "process deletion" system call to delete the process attributes 119 and 120 from its internal database.

The system call trap handler 116 (or in an alternative embodiment, a separate module) maintains and supplies to the network filter drivers 140 and 150 the attributes to be associated with each NIC (103 and 104) on the computing device. For example, the network attribute associated with NIC 103 is the NIC attribute 105. The system call trap handler 116 also supplies to the session filter driver 130 the process attributes 119 and 120, which are associated with each process 101 and 102, respectively. The information supplied to the session filter driver 130 via connection 171 is based on the process identification.

The system call trap handler 116 also compares a particular process attribute 119 (i.e., a NetAttr) to the network attribute associated with each NIC and determines whether or not a process having a particular process attribute 119 (NetAttr) can use a particular NIC 103 having a particular NIC attribute 105.

The session filter driver 130 is positioned above the TCP/IP driver 110 and intercepts all calls to the TCP/IP driver 110, and all results from the TCP/IP driver 110. The session filter driver 130 intercepts the "create network objects" system call, and passes it to the TCP/IP driver 110. The TCP/IP driver 110 creates a network object, and returns a handle, as described above. This result is intercepted by the session filter driver 130, which queries the system call trap handler 116 via connection 171 for the process' NetAttr attribute (process attribute 119 or 120) and stores this information (process handle and NetAttr attribute) as a new entry in the database 115 via connection 164. The session filter driver 130 then passes the result of the "create network object" call to the process 101, as the return value of the system call.

The session filter driver 130 also intercepts a system call that associates the local process' endpoint address with a particular network object. The session filter driver 130 updates the database 115 with this information and then passes this request to the underlying TCP/IP driver 110.

The session filter driver 130 also intercepts a system call that removes the network object (when the handle is no longer required by the process 101) and then updates the database 115 accordingly. The session filter driver 130 then passes this request to the underlying TCP/IP driver 110.

The database 115 will contain the following pieces of information for each network object:
Network Object Handle
Process Attribute (as returned by the system call trap handler)
Type of Network Object (UDP/TCP)
Local Endpoint Address In accordance with an aspect of the invention, there is a network filter driver 140 and 150 associated with each NIC 103 and 104, respectively. However, for simplicity, the operation of one network filter driver 140 will be described. The network filter driver 140 is positioned below the TCP/IP driver 110 and above the network driver 113. When one of the processes 101 or 102 on the computing device 100 is sending packets, the network filter driver 140 intercepts the TCP/IP packets from the TCP/IP driver 110 and obtains the local process' address (i.e., the address of the sending process 101 in this example) from the intercepted packet. The network filter driver 140 queries the database 115 via connection 162 and uses the local process' address (the sending process in this example) to obtain the attribute 119 associated with the local process 101.

The network filter driver 140 also associates a network attribute with each NIC 103 and 104. For example, the NIC attribute 105 is associated with the NIC 103. This association may be set up by an operator using an application program that stores this information in a location (for example, but not limited to a file in memory), from where the network filter driver 140 can retrieve it. The network filter driver can retrieve this network attribute during load time or when the operator changes the attribute. The network filter driver 140 can store a copy of this attribute in an associated database, such as database 115. For simplicity, only the NIC attribute 105 associated with the NIC 103 is illustrated in FIG. 2.

The system call trap handler 116 is then queried via connection 161 for a decision as to whether or not the packet should be sent. This decision is made by comparing the process attribute 119 (NetAttr) (assuming that process 101 is the sending process) that was retrieved from the database 115 with the network attribute 105 of the NIC 103.

If the system call trap handler 116 specifies that the packet should be dropped (for example, if the process attribute 119 differs from the NIC attribute 105), the network filter driver 140 will drop the packet. Otherwise, the packet is delivered to the network driver 113 for transmission over the network 11 via NIC 103.

When receiving packets via network 11, the network filter driver 140 intercepts the TCP/IP packets from the network driver 113 and obtains the local process' endpoint (destination) from the packet. The network filter driver 140, using the local process' endpoint address, accesses database 115 via connection 162 to obtain the attribute associated with the receiving process. For example, if the process 101 is the receiving process, then the process attribute 119 (NetAttr) would be obtained by the network filter driver 140 from the database 115.

The network filter driver 140 then queries the system call trap handler 116 via connection 161 for a decision as to whether or not the packet should be delivered to the process 101. This decision is made by comparing the process attribute 119 (NetAttr) that is associated with the receiving process (process 101) and that was retrieved from the database 115 with the NIC attribute 105 associated with the NIC 103 from which the packet was received.

If the system call trap handler 116 specifies that the packet should be dropped (for example, if the process attribute 119 differs from the NIC attribute 105), the network filter driver 140 will drop the packet. Otherwise, the packet is delivered to the TCP/IP driver 110 for delivery to the receiving process (process 101).

FIGS. 3A through 3C, 4A and 4B, 5A and 5B, and 6 are flowcharts collectively illustrating the operation of the invention. The flowcharts of FIGS. 3A through 3C, 4A and 4B, 5A and 5B, and 6 show the architecture, functionality, and operation of a possible implementation of the process attribute based computer network filter of the invention. In this regard, each block represents a module, segment, or portion of code, which comprises one or more executable instructions for implementing the specified logical function(s). It should also be noted that in some alternative implementations, the functions noted in the blocks may occur out of the order noted in FIG. 3A. For example, two blocks shown in succession in FIG. 3A may in fact be executed substantially concurrently or the blocks may sometimes be executed in reverse order, depending upon the functionality involved, as will be further clarified below.

Figure 3A:
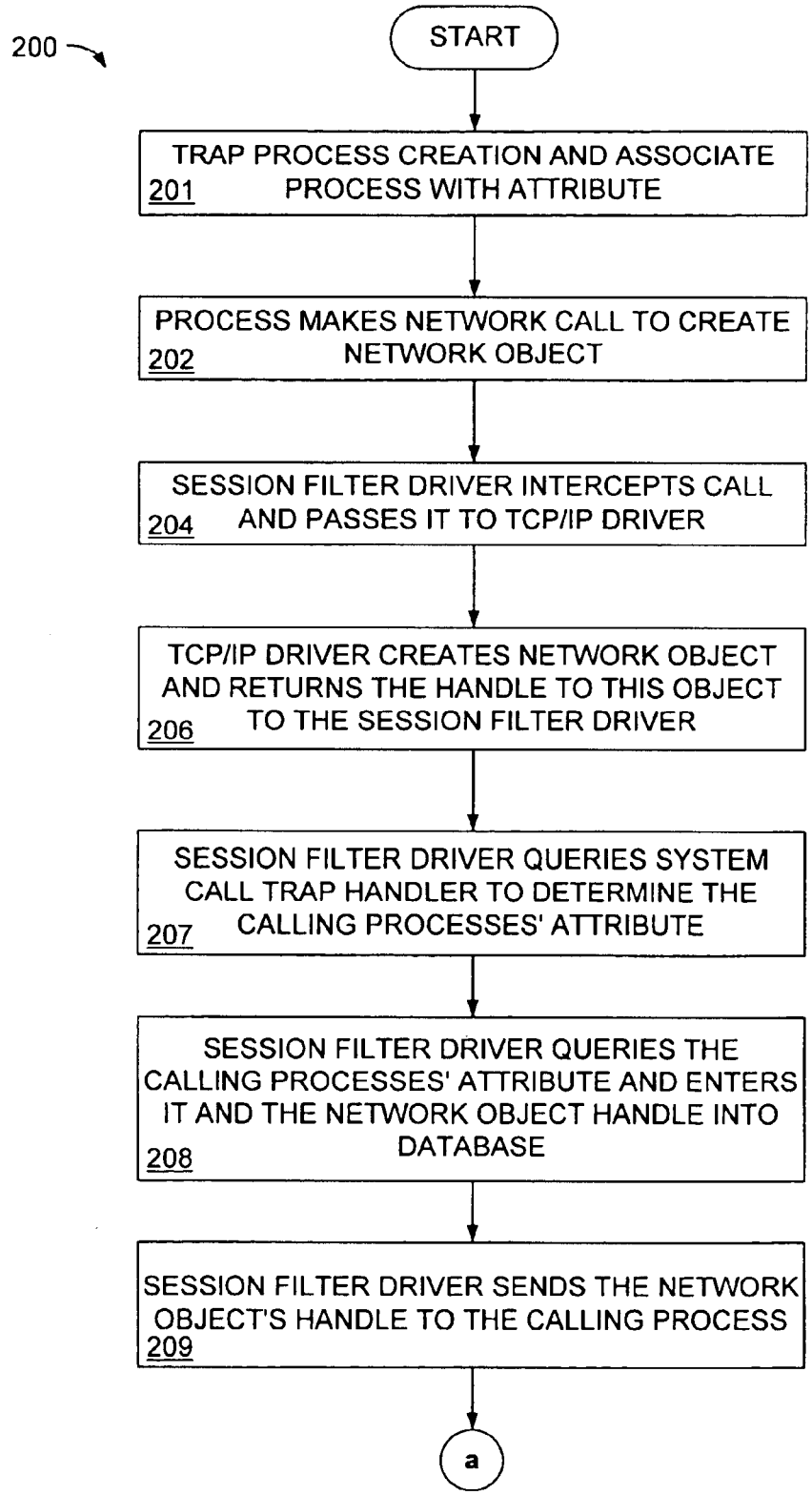
FIGS. 3A through 3C are flowcharts collectively illustrating the establishment of a connection through which the process attribute based computer network filter operates.
Figure 3B:
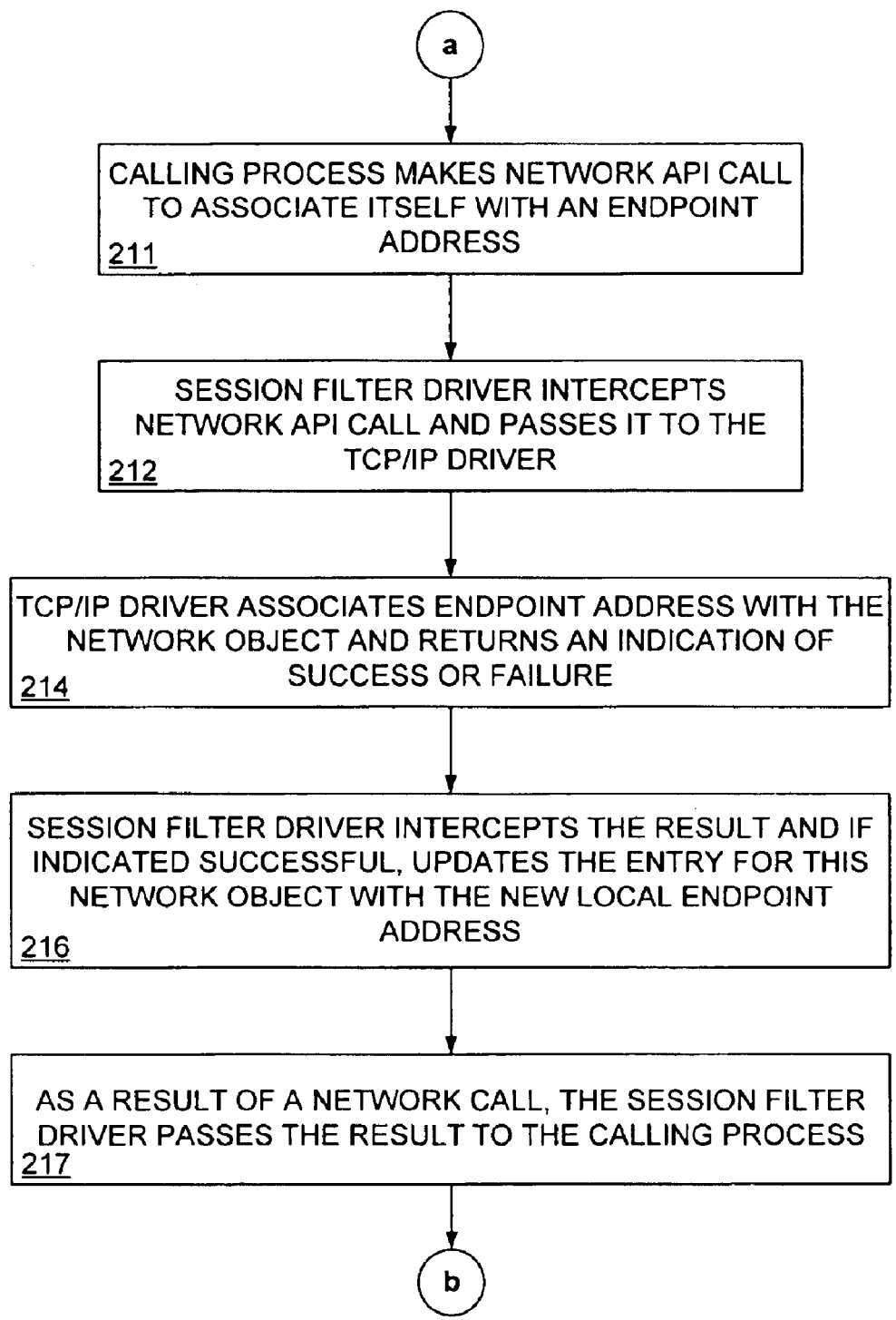
Figure 3C:
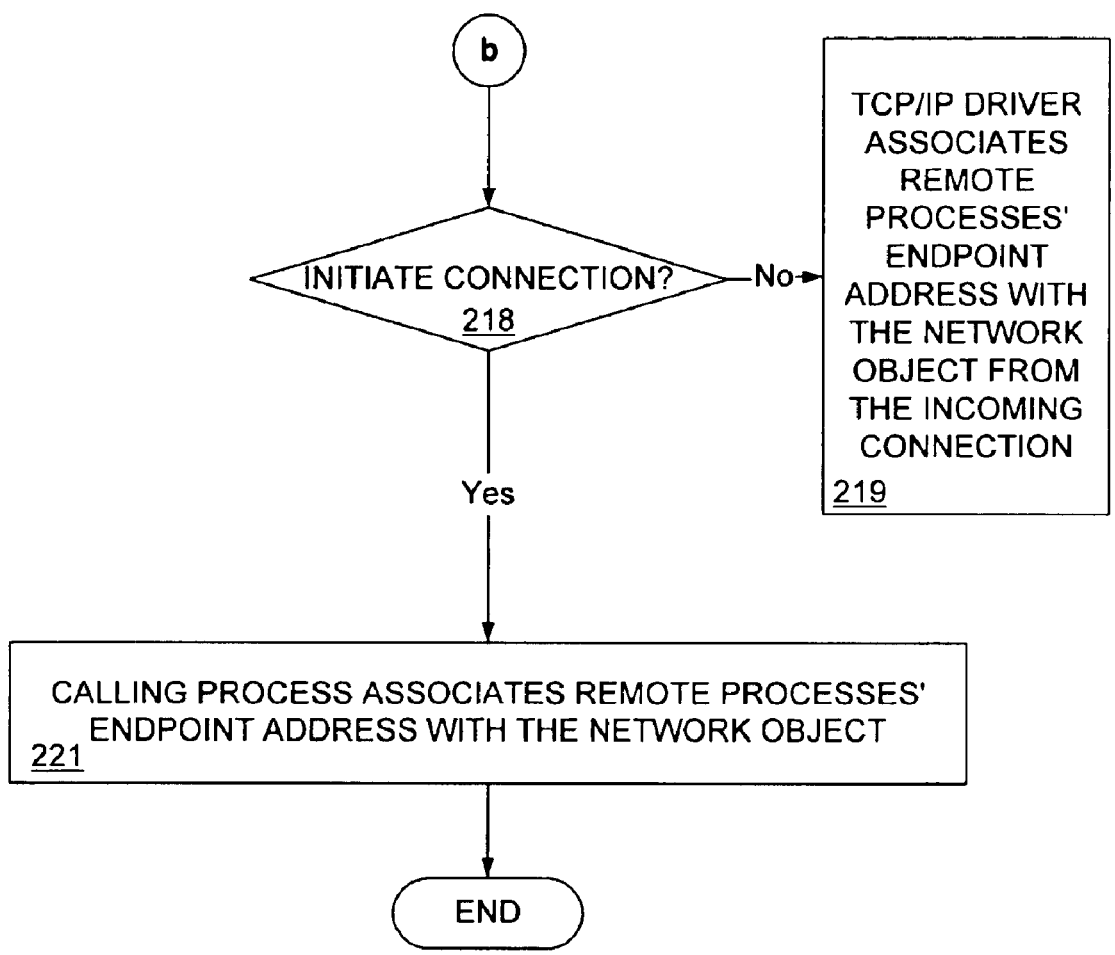

FIGS. 3A through 3C are flowcharts collectively illustrating the establishment of a connection through which the process attribute based computer network filter operates.

In block 201 the system call trap handler 116 traps the creation of processes, such as process 101 and process 102.

The system call trap handler 116 associates each process with a NetAttr attribute, such as attribute 119 associated with process 101. In block 202 the process 101 makes a network API call 108 to create a network object. In block 204 the session filter driver 130 intercepts the create network object call and passes it to the TCP/IP driver 110. In block 206 the TCP/IP driver 110 creates a network object, and returns the handle to this object back to the session filter driver 130.

In block 207 the session filter driver 130 queries the system call trap handler 116 to determine the calling process' (process 101) attribute 119. In block 208 the session filter driver 130 determines the attribute 119 of the process 101 and enters the attribute 119 and the network object handle into the database 115. In block 209, as a result of the "create network object" network API call made in block 202, the session filter driver 130 sends the network object's handle back to the process 101.

In block 211 the process 101, by passing the handle to the network object, makes a network API call 108 so as to associate itself with a particular endpoint address. In block 212 the session filter driver 130 intercepts this call and passes it to the TCP/IP driver 110. In block 214 the TCP/IP driver 110 associates the particular endpoint address identified in block 211 with the network object and returns a result indicating success or failure. In block 216 the session filter driver 130 intercepts the result and if indicated successful, updates the entry for this particular network object with the new local endpoint address information. In block 217, and as a result of the network API call 108 made in block 211, the session filter driver 130 passes the result to the process 101.

In block 218 the process 101 determines whether to establish a connection or await an incoming connection. If, in block 218, the process 101 awaits an incoming connection, then, in block 219, the TCP/IP driver 110 associates the remote process' endpoint address with the network object from the incoming connection. If a connection is to be established, the process 101, in block 221, associates the remote process' endpoint address with the network object. The process 101 accomplishes this by making a network API call 108 with the remote process' endpoint address and the handle to the network object. This request is processed by the TCP/IP driver 110. Regardless of whether the endpoint is a calling endpoint or a destination endpoint, the process is the same.

Figure 4A:
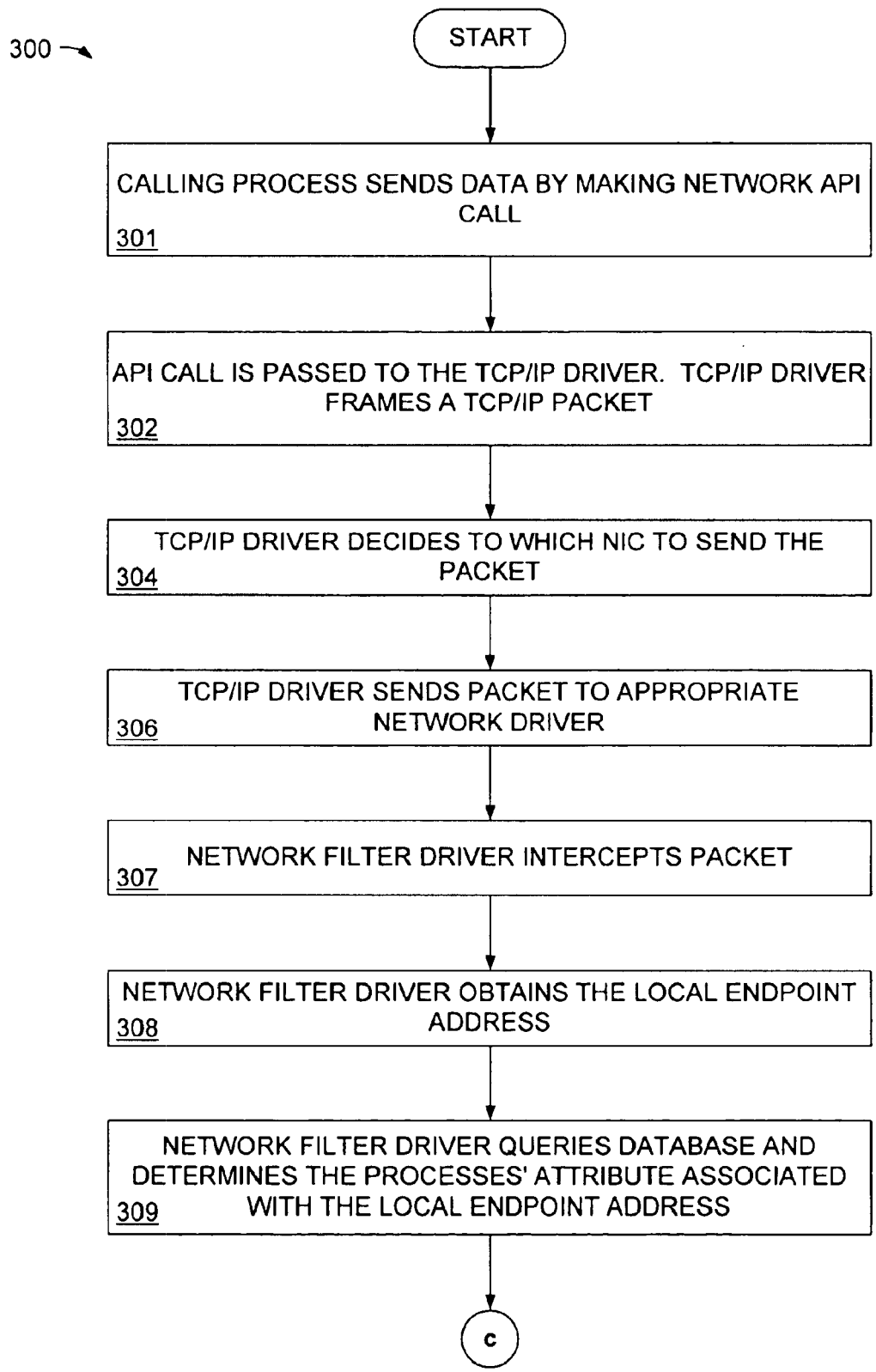
FIGS. 4A and 4B are flowcharts collectively illustrating the transmission of a communication message in accordance with the invention.
Figure 4B:
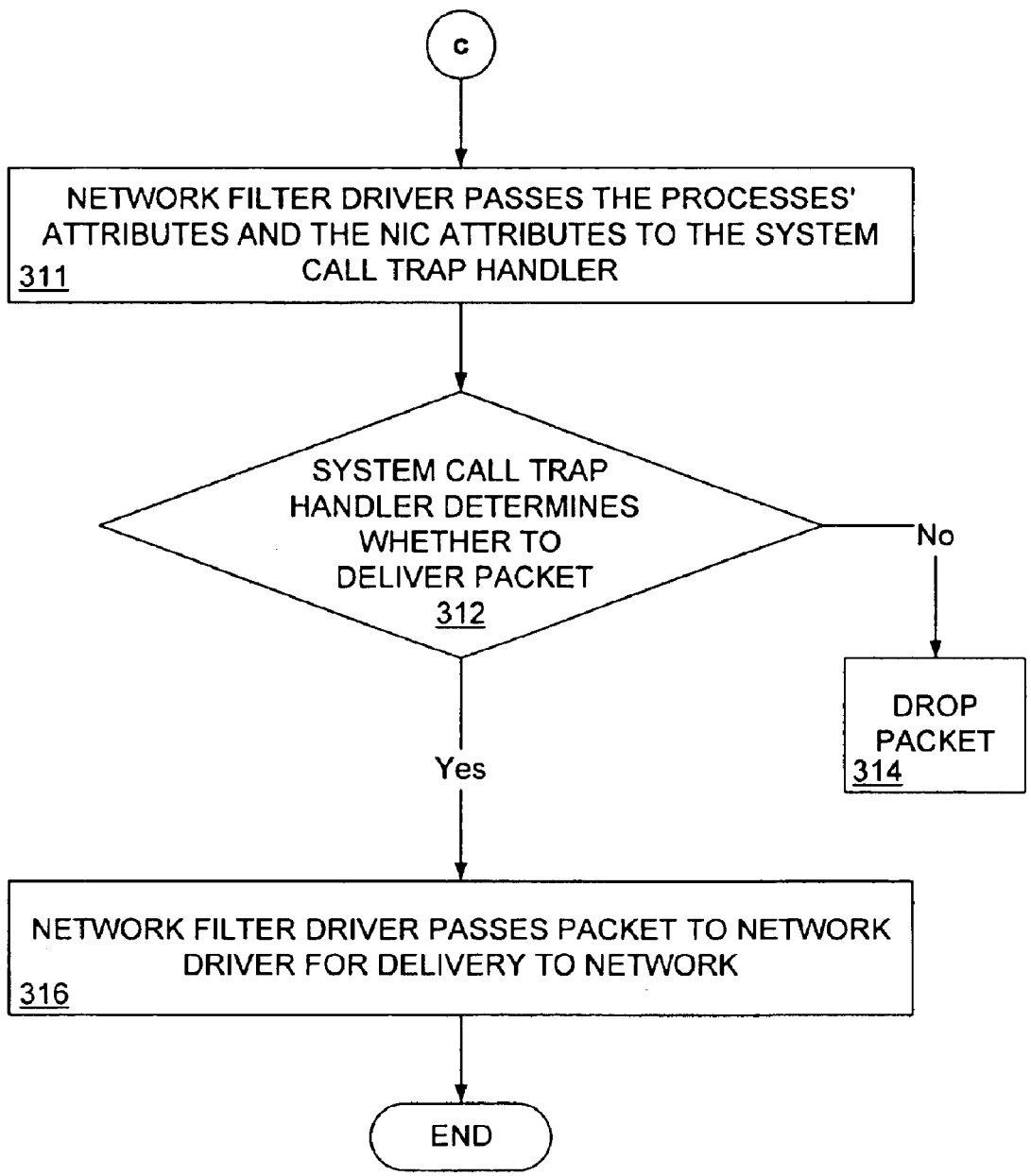

FIGS. 4A and 4B are flowcharts collectively illustrating the transmission of a communication message in accordance with the invention. In block 301 the calling process 101 sends data by making a network API call 108 including the network object's handle and the data to be sent. In block 302 the network API call 108 is passed to the TCP/IP driver 110, which uses the information in the network object to frame a TCP/IP packet. In block 304 the TCP/IP driver 110 also determines to which NIC (e.g., NIC 103 or NIC 104 of FIG. 2) to send the packet.

In block 306 the TCP/IP driver 110 sends the packet to the appropriate network driver 113. In block 307 the network filter driver 140 intercepts this packet. In block 308 the network filter driver 140 inspects the packet and obtains the address of the local endpoint process. In block 309 the network filter driver 140 queries the database 115 to determine the attribute 119 (NetAttr) associated with the process at the local endpoint address. In block 311 the network filter driver 140 passes the process' attribute 119 and the NIC attribute 105 to the system call trap handler 116.

In block 312 the system call trap handler 116 determines whether the packet can be delivered by comparing the process' attribute 119 with the network attribute (NIC attribute 105) associated with the NIC 103. If the system call trap handler 116, after comparing the process attribute and the NIC attribute, determines that the packet should not be sent, then in block 314 the packet is dropped by the network filter driver 140. If the system call trap handler 116 determines that communication may proceed, then, in block 316, the network filter driver 140 passes the packet to the network driver 113 driver, from where it is released on the network via the NIC 103.

Figure 5A:
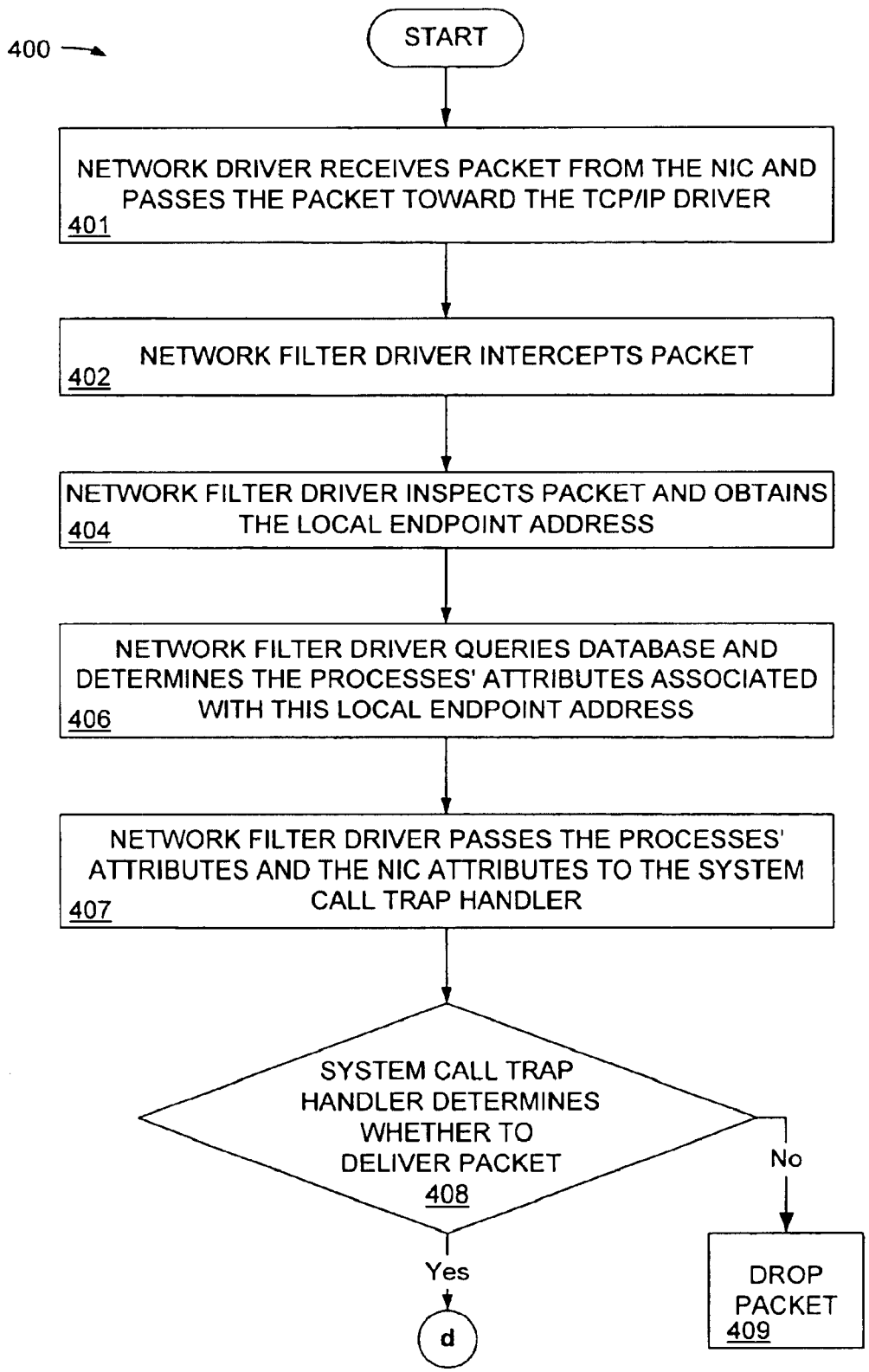
FIGS. 5A and 5B are flowcharts collectively illustrating the receipt of a communication message in accordance with the invention.
Figure 5B:
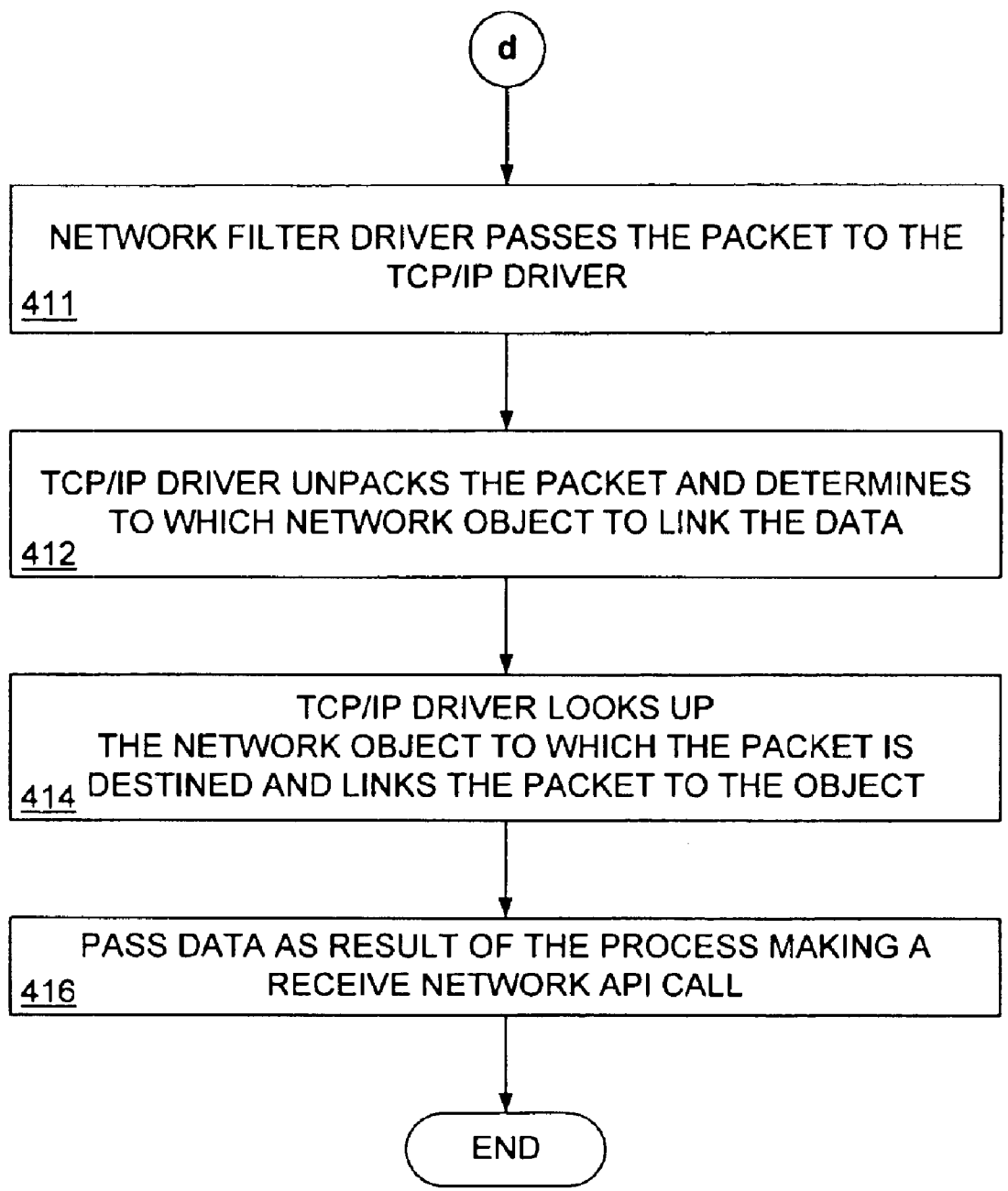

FIGS. 5A and 5B are flowcharts collectively illustrating the receipt of a communication message in accordance with the invention. In block 401 the network driver 113 receives a packet from the NIC 103 and passes it towards the TCP/IP driver 110. In block 402 the network filter driver 140 intercepts the received packet. In block 404 the network filter driver 140 inspects the packet and obtains the local endpoint's (destination) address. In block 406 the network filter driver 140 queries the database 115 to determine the process attribute, such as attribute 119, associated with this local endpoint address.

In block 407 the network filter driver 140 passes the process attribute 119 and the NIC attribute 105 to the system call trap handler 116. In block 408 the system call trap handler 116 determines whether to deliver the packet by comparing the process' attribute 119 with the NIC attribute 105 associated with the NIC 103. If the system call trap handler 116, after comparing the process attribute and the NIC attribute, determines that the packet should not be delivered, then in block 409 the packet is dropped by the network filter driver 140. If the system call trap handler 116 determines that communication may proceed, then in block 411 the system call trap handler 116 passes the packet to the TCP/IP driver 110.

In block 412 the TCP/IP driver 110 unpacks the packet, and determines to which network object to link the data. When the process 101 wishes to receive data, it makes a network API call 108 and passes the network object's handle to the TCP/IP driver 110. In block 414 the TCP/IP driver 110 looks up the network object to which the packet is destined and links the packet to the object. If there is no data linked to the object, the TCP/IP driver either returns an error or awaits new data, depending upon the option with which the process made the network API call. In block 416 the TCP/IP driver 110 passes this data as the result of the network API call 108 made in block 412.

Figure 6:
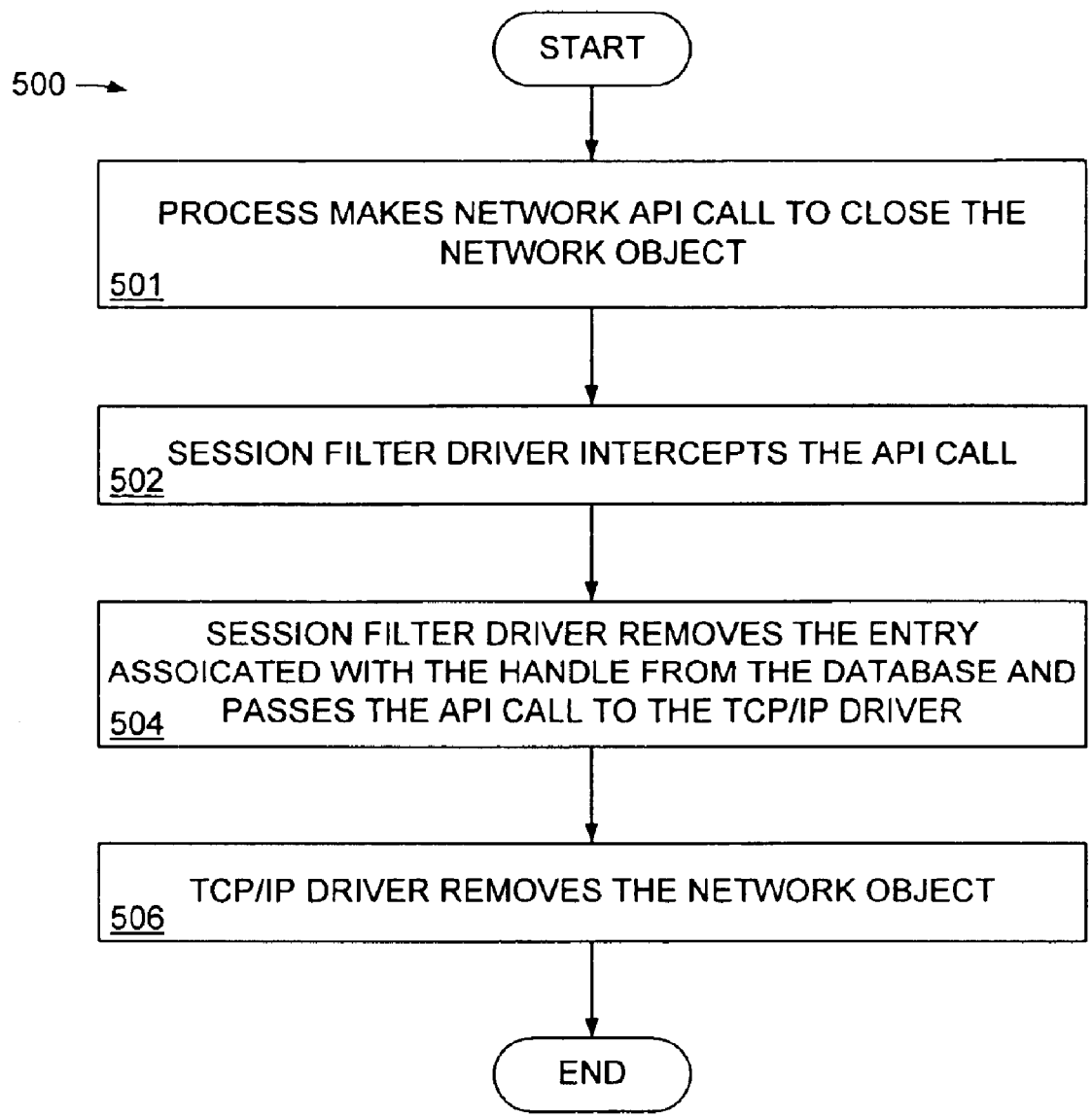
FIG. 6 is a flowchart illustrating the manner in which a communication session is closed.

FIG. 6 is a flowchart illustrating the manner in which a communication session is closed. In block 501 the process 101 makes a network API call 108 to close the network object by passing the handle to the network object. In block 502 this request is intercepted by the session filter driver 130. In block 504 the session filter driver 130 removes the entry associated with the handle from the database 115 and passes the request to the TCP/IP driver 110. In block 506 the TCP/IP driver 110 removes the network object.

It will be apparent to those skilled in the art that many modifications and variations may be made to the preferred embodiments of the present invention, as set forth above, without departing substantially from the principles of the present invention. For example, although illustrated using only two processes, the process attribute based computer network filter of the invention is capable of supporting many additional application programs and their corresponding processes, such as, for example but not limited to, a file transfer process, a mail server process, etc. Furthermore, it is contemplated that an application program may have more than one process running simultaneously. Further still, although illustrated using only two network interface cards, the network filter system of the invention is capable of supporting many additional network interface cards. All such modifications and variations are intended to be included herein within the scope of the present invention, as defined in the claims that follow.

What is claimed is:

1. A process attribute based computer network filter system, comprising:
   a computing device having a network driver and a network interface card, the computing device further comprising:
   a software process including a process attribute;
   an application program interface (API) in communication with said software process and configured to communicate packets through the network driver to the network interface card, said network interface card including a network attribute;
   an operating system kernel in communication with said software process;
   a system call trap handler associated with said operating system kernel, said system call trap handler operative to determine said process attribute of said software process and said network attribute of said network interface card;
   a session filter driver in communication with said system call trap handler;
   a database associated with said session filter driver and said network filter driver,
   wherein said system call trap handler compares said process attribute with said network attribute to determine whether said software process is authorized access to said network interface card; and
   a network filter driver associated with said system call trap handler and operative, based on comparing the process attribute with the network attribute, to drop the communications packets if the system call trap handler determines that the software process is not authorized access to the network interface card, and to pass the communication packets if the system call trap handler determines that the software process is authorized access to the network interface card.

2. The system of claim 1, wherein said database includes said process attribute and said network attribute.

3. The system of claim 1, wherein said session filter driver is configured to receive a communication packet from said API, query said system call trap handler to determine said process attribute and said network attribute, place said process attribute and said network attribute in said database, and determine whether said communication packet can be sent to said network driver.

4. The system of claim 1, wherein said network filter driver is configured to receive a communication packet from said network driver, query said system call trap handler to determine said process attribute and said network attribute, place said process attribute and said network attribute in said database, and determine whether said communication packet can be sent to said network interface card.

5. The system of claim 1, wherein said network filter driver is configured to receive a communication packet from said network interface card, query said database to determine said process attribute and said network attribute, and determine whether said communication packet can be sent to said network driver.

6. The system of claim 1, wherein said network driver supports a plurality of network filter drivers associated with said network interface card.

7. The system of claim 1, wherein the network interface card is a first network interface card; and
   the computing device additionally comprises a second network interface card including a second network attribute.

8. The system of claim 7, wherein, if the system trap handler determines that the software process is authorized access to the first network interface card and is not authorized access to the second network interface card, the network filter driver passes communication packets associated with the first network interface card and drops communication packets associated with the second network interface card.

9. The system of claim 1, wherein said system call trap handler determines that said software process is not authorized access if said process attribute differs from said network attribute.

10. A method for a process attribute based computer network filter, the method comprising:
    operating a software process on a computer, the computer having a network driver and a network interface card, the network interface card comprising a network attribute, said software process including a process attribute;
    placing said process attribute and said network attribute in a database, the database being stored at the computer;
    intercepting, at the computer, communication packets associated with the software process;
    comparing, at the computer, said process attribute with said network attribute in response to the intercepting of the communication packets; and
    determining, at the computer, whether said software process is authorized access to said network interface card based on the comparing such that, if the software process is not authorized access, the communication packets are dropped at the computer.

11. The method of claim 10, further comprising:
    receiving, in a session filter driver, a communication packet;
    querying a system call trap handler to determine said process attribute and said network attribute;
    placing said process attribute and said network attribute in said database; and
    determining whether said communication packet can be sent to said network driver.

12. The method of claim 10, further comprising:
    receiving, in a network filter driver, a communication packet;
    querying a system call trap handler to determine said process attribute and said network attribute;
    placing said process attribute and said network attribute in said database; and
    determining whether said communication packet can be sent to said network interface card.

13. The method of claim 10, further comprising:
    receiving, in a network filter driver, a communication packet;
    querying said database to determine said process attribute and said network attribute; and
    determining whether said communication packet can be sent to said network driver.

14. The method of claim 10, wherein, in determining whether said software process is authorized access, the communication packets are dropped if said process attribute differs from said network attribute.

15. A computer readable medium having a program for a process attribute based computer network filter, the program comprising logic configured to perform:

operating a software process on a computer, the computer having a network driver and a network interface card, the network interface card comprising a network attribute, said software process including a process attribute;

placing said process attribute and said network attribute in a database, the database being stored at the computer;

intercepting, at the computer, communication packets associated with the software process;

comparing, at the computer, said process attribute with said network attribute in response to the intercepting of the communication packets; and determining, at the computer, whether said software process is authorized access to said network interface card based on the comparing such that, if the software process is not authorized access, the communication packets are dropped at the computer.

16. The program of claim 15, further comprising logic configured to perform:

receiving, in a session filter driver, a communication packet;

querying a system call trap handler to determine said process attribute and said network attribute;

placing said process attribute and said network attribute in said database; and determining whether said communication packet can be sent to said network driver.

17. The program of claim 15, further comprising logic configured to perform:

receiving, in a network filter driver, a communication packet;

querying a system call trap handler to determine said process attribute and said network attribute;

placing said process attribute and said network attribute in said database; and determining whether said communication packet can be sent to said network interface card.

18. The program of claim 15, further comprising logic configured to perform:

receiving, in a network filter driver, a communication packet;

querying said database to determine said process attribute and said network attribute; and determining whether said communication packet can be sent to said network driver.

19. The computer readable medium of claim 15, wherein, in determining whether said software process is authorized access, the communication packets are dropped if said process attribute differs from said network attribute.

* * * * *